United States Patent [19]

Würmli

[11] 4,150,944

[45] Apr. 24, 1979

[54] SULPHONATED, AROMATIC REACTION PRODUCTS, PROCESSES FOR THEIR MANUFACTURE AND THEIR USE AS SUBSTANCES HAVING A TANNING ACTION

[75] Inventor: Albert Würmli, Riehen, Switzerland

[73] Assignee: Ciba-Geigy Corporation, Ardsley, N.Y.

[21] Appl. No.: 786,161

[22] Filed: Apr. 11, 1977

[30] Foreign Application Priority Data

Apr. 22, 1976 [CH] Switzerland .................. 5046/76

[51] Int. Cl.² .................. C08G 75/20; C08G 75/24; C14C 3/20
[52] U.S. Cl. .................. 94.24; 528/131; 528/132; 528/150; 528/153
[58] Field of Search .................. 8/94.24; 260/49; 528/131, 150

[56] References Cited

U.S. PATENT DOCUMENTS

| | | | |
|---|---|---|---|
| 3,340,215 | 9/1967 | Sellet | 8/94.24 |
| 3,418,277 | 12/1968 | Cohen et al. | 260/49 |
| 3,852,374 | 12/1974 | Erdmann et al. | 8/94.24 |
| 3,973,904 | 8/1976 | Endres et al. | 8/94.24 |
| 4,009,996 | 3/1977 | Würmli | 260/49 |

*Primary Examiner*—John C. Bleutge
*Attorney, Agent, or Firm*—Prabodh I. Almaula

[57] ABSTRACT

The invention relates to sulphonated, aromatic reaction products as agents for tanning hides and leather. They are obtained by reacting a sulphonation product, which is previously formed from a diphenyl ether, a phenol and a sulphonating agent, with formaldehyde, with a reaction mixture of an aminoplast-forming agent and formaldehyde or with an aminoplast precondensate.

16 Claims, No Drawings

SULPHONATED, AROMATIC REACTION PRODUCTS, PROCESSES FOR THEIR MANUFACTURE AND THEIR USE AS SUBSTANCES HAVING A TANNING ACTION

The invention relates to sulphonated, aromatic reaction products of
(1) 100 parts by weight of a sulphonation product of
  (A) 10 to 90 percent by weight of at least one diphenyl ether which is optionally substituted by methyl,
  (B) 90 to 10 percent by weight of at least one phenol which is optionally substituted by methyl, the sum of components (A) and (B) being 1 mol, and
  (C) 1 to 2 mols, calculated as sulphuric acid, of a sulphonating agent and
(2) 1 to 6 parts by weight of formaldehyde or of a formaldehyde donor or
(3) 4 to 24 parts by weight of a reaction mixture consisting of
  (D) at least one aminoplast-forming agent and
  (E) formaldehyde or a formaldehyde donor, or
(4) 4 to 24 parts by weight of at least one aminoplast precondensate.

The reaction products according to the invention have always been manufactured from component (1), which itself has previously been formed from components (A), (B) and (C), and one of the components (2), (3) or (4). The reaction products obtained from components (1) and (2) are less preferred. The most preferred reaction products are those obtained from components (1) and (4) and especially those obtained from components (1) and (3).

Further preferred reaction products are those obtained from 100 parts by weight of component (1) and 2 to 5 parts by weight of component (2) and especially from 100 parts by weight of component (1) and 9 to 15 parts by weight of component (4) or, in particular, (3).

Components (1) which can be used are, above all, those which have previously been formed from 20 to 75, and especially 60 to 70, percent by weight of component (A) and 80 to 25, and especially 40 to 30, percent by weight of component (B), the sum of components (A) and (B) being 100 percent by weight, and from 1.05 to 1.50, and especially 1.15 to 1.35, mols of component (C), the sum of components (A) and (B) being 1 mol. A particularly interesting component (1) has been preformed, for example, from a mixture of 70 parts by weight of component (A) and 30 parts by weight of component (B), the sum of components (A) and (B) being 1 mol, and 1.3 mols of component (C).

An aqueous formaldehyde solution can be used, above all, as component (2) or (E). Possible formaldehyde donors, which can be used in place of formaldehyde, which is preferred, are, inter alia, trioxane or, in particular, paraformaldehyde. The abovementioned proportions of 1 to 6 parts by weight of component (2) or 4 to 24 parts by weight of component (3) per 100 parts by weight of component (B 1) and of 1 to 3 mols of component (E) per 1 mol of component (D) are always relative to formaldehyde. When a formaldehyde donor, such as trioxane or, in particular, paraformaldehyde, is employed, the quantities of the formaldehyde donor must be adjusted in accordance with the formaldehyde which is actually released.

Preferred components (3) consist of 1 mol of component (D) and 1 to 3, especially 2, mols of component (E) and preferred components (4) consist of aminoplast precondensates which are mono-, di- or tri-methylolated and preferably dimethylolated.

Components (A) and (B) which can be used are, above all, those which are optionally substituted by at most 4 methyl groups. Accordingly, preferred components (A) consist, for example, of a dixylyl ether, above all of diphenyl ether or in particular of a ditolyl ether and preferred components (B) consist, for example, of a xylenol, above all of a cresol or in particular of phenol. Industrial mixtures of isomers are of primary interest as dixylyl ethers, xylenol and, in particular, of ditolyl ethers and cresol. Components (A) and (B) can also be in the form of mixtures of the compounds mentioned, these mixtures being less preferred.

Preferred components (C) consist of oleum or, in particular, of sulphuric acid monohydrate. Oleum which can be used is, above all, oleum which contains 20 percent by weight of $SO_3$. Mixtures of technical grade, for example 94 percent strength by weight, sulphuric acid and preferably 20 percent strength by weight oleum, and above all mixtures consisting of sulphuric acid to which oleum has been added in an amount such that a 100 percent strength by weight sulphuric acid, that is to say sulphuric acid monohydrate, is formed, can also be used.

The aminoplast-forming agents, which in the unmethylolated form are employed as component (D), are nitrogen compounds which can be methylolated. The addition products of formaldehyde and these nitrogen compounds which can be methylolated, that is to say aminoplast-forming agents, are generally known as so-called aminoplast precondensates and are employed as component (4).

Examples of aminoplast-forming agents which may be mentioned are triazine, melamine, triazone, urone, cyanuric acid, acetoguanamide (2,4-dihydroxy-6-methyl-1,3,5-triazine), acetoguanide (2-amino-4-hydroxy-6-methyl-1,3,5-triazine), formoguanamine (2,4-diamino-1,3,5-triazine), ammelide (2,4-dihydroxy-6-amino-1,3,5-triazine) and ammeline (2,4-diamino-6-hydroxy-1,3,5-triazine). Aminoplast-forming agents which have at most 4 nitrogen atoms, such as acetylenediurea, urethane or cyanamide, are also preferred. The most preferred compounds are urea and the so-called urea derivatives, especially those which contain 2 or 3 nitrogen atoms and a single structural element of the formula

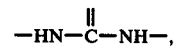

such as, for example, oxadiazine (1-oxo-4-keto-3,5-diazine), propyleneurea, dihydroxyethyleneurea, ethyleneurea, biuret, thiourea and guanidine. Compounds of primary interest here are above all biuret and especially urea.

Preferred components (D) consist of thiourea, ethyleneurea, preferably biuret and in particular urea and preferred components (4) consist of the corresponding mono-, di- or tri-methylolated aminoplast precondensates and especially of the corresponding dimethylolated aminoplast precondensates. Mixtures of the said aminoplast-forming agents or aminoplast precondensates can also be used as components (D) or (4). Compounds of primary interest are urea on its own as component (D) and dimethylolurea on its own as component (4).

Component (4) can also be formed in situ by adding component (3), that is to say components (D) and (E), to the reaction mixture.

The reaction products according to the invention are manufactured by first reacting components (A), (B) and (C) with one another at elevated temperature, then further reacting the sulphonation product, which is thus obtained, as component (1) with one of the components (2), (3) or (4) at elevated temperature, subsequently adding an organic or, preferably, inorganic base to the reaction product which is thus obtained and then optionally adding an organic acid. This manufacturing process for the reaction products according to the invention thus also constitutes a subject of the present invention.

The reaction of components (A), (B) and (C) is preferably carried out in the melt at 110° to 180° C. At temperatures below 110° C. the reaction proceeds too slowly, whilst temperatures above 180° C. effect an undesired dark colouration of component (1). As a rule, the reaction is started under normal pressure at 110° to 140° C., and preferably 120° to 135° C., and the sulphonation mixture is kept at this temperature for 2 to 3 hours. The temperature is then preferably raised to 145° to 170° C. and the water formed during the reaction is appropriately removed under a reduced pressure of 10 to 20, and especially 12 to 15, mm Hg. In a usual case, the sulphonation reaction has ended after a reaction time of 2 to 10, and especially 3 to 5, hours.

The sulphonation reaction can be followed by titrating samples of the reaction mixture, which have been diluted with water, with an aqueous sodium hydroxide solution. The consumption, in milliliters, of 1.0 N sodium hydroxide required to adjust the pH value of 1 g. of the reaction mixture to 3.5 is termed the acid number. The sulphonation reaction has ended as soon as the acid titre of the reaction mixture no longer decreases and remains constant. The decrease in the acid titre during the sulphonation reaction indicates that the sulphonation products undergo a partial condensation reaction with themselves, that is to say that partial auto-condensation takes place, some of the free sulpho groups —$SO_3H$ of the sulphonation products being converted to sulphone bridges —$SO_2$— in the auto-condensation products. After the reaction has ended, the acid titre is as a rule 3.0 to 5.5 especially 4.0 to 4.6.

In the usual case, reaction components (A), (B) and (C) are all heated to 110° to 180° C. at the same time. However, it is also appropriate first to heat up component (A) or, preferably, (B) with component (C) to 110° to 120° C. and then to add component (B) or, preferably, (A) and only then to heat the reaction mixture to 110° to 180° C.

The reaction of component (1), which is thus obtained, with one of the components (2), (3) or (4) is preferably carried out at 60° to 95° C. Appropriately, the resulting hot sulphonation mixture, as component (1), is cooled to 75° to 95° C. and preferably diluted with water, and one of the components (2), (3) or (4), which as a rule are in the form of aqueous solutions, is added. In the usual case the reaction time is 2 to 20, and especially 3 to 6, hours.

Although component (1) can be stored, it is most appropriate and most economical to carry out the reaction of component (1) with one of the components (2), (3) or (4) in the same reaction vessel by the so-called one-pot process, without isolation of any intermediate product.

For working-up, an organic or, preferably, inorganic base is added to the resulting reaction product.

Organic bases employed are tertiary, secondary and, above all, primary alkylamines or alkanolamines with 1 to 6 carbon atoms and in particular ethanolamines. Tri-, di- or mono-methylamine, in particular tri-, di- or mono-ethylamine and especially tri-, di- or mono-ethanolamine are preferred.

Inorganic bases employed are alkaline earth metal hydroxides or, above all, alkali metal hydroxides. Magnesium hydroxide and, above all, potassium hydroxide or sodium hydroxide are preferred and concentrated aqueous solutions are of primary interest. A particularly suitable inorganic base is ammonia, above all in the form of a concentrated aqueous solution.

The pH value of the reaction products, which are in the form of concentrated aqueous solutions, is adjusted to 3 to 7, and preferably 3 to 4, by the addition of the abovementioned bases.

Tri-, di- and, above all, mono-carboxylic acids with 1 to 6 carbon atoms can be used as organic acids, which are optionally added to the reaction products. A preferred tricarboxylic acid is, inter alia, citric acid. Maleic acid and oxalic acid may be mentioned as examples of further preferred dicarboxylic acids. Examples which may be mentioned of the most preferred monocarboxylic acids are lactic acid, acetic acid and formic acid, acetic acid and, in particular, formic acid being of primary interest.

On the addition of the abovementioned acids, the pH value of the reaction products, which are in the form of concentrated aqueous solutions, falls from the original value of 3 to 7, and preferably 3 to 4, after the addition of the base, to 2.5 to 3.5 after the addition of the acid.

The reaction products are as a rule in the form of ready-to-use, aqueous, viscous, syrupy solutions which have a solids content of preferably 30 to 60 percent by weight and especially 40 to 55 percent by weight. However, it can also be advantageous to evaporate the aqueous solutions of the reaction products, for example at 70° to 80° C. under reduced pressure, to give a solid form, inter alia by spray-drying or by forming granules. The solid reaction products preferably have a solids content of 90 to 100, and especially 96 to 100, percent by weight. Both the syrupy reaction products and the solid reaction products are soluble in water. If the reaction products are obtained in a solid form, the optional addition of the organic acids can appropriately be carried out prior to evaporation of the aqueous solutions. The organic acid can, however, also be mixed into the reaction product, which is preferably in the form of a powder.

The precise chemical constitution of the reaction products according to the invention can be characterised only by their mode of manufacture. Nevertheless, on the basis of the acid titre which is obtained for component (1), it can be assumed that probably 10 to 40% of the free sulpho groups have been converted into sulphone bridges.

The new, sulphonated, aromatic reaction products according to the invention are used as substances which have a tanning action. The use of these reaction products is thus also a subject of the present invention.

Analysis of the reaction products according to the invention to determine the tanning agent content is carried out by the filter process of the VGCT (Verein fur Gerbereichemie und Technik (Association for Tanning Chemistry and Technology)) (in this context compare "Das Leder" 5 [2], 28 to 31 (1954)).

The reaction products according to the invention, which have a tanning action, are suitable for tanning or re-tanning all types of hides and leather. Reaction products to which no acid has been added are preferably used for leathers which have not been neutralised. Reaction products of this type have a preferred pH value of 5 to 7 after the addition of the base. The reaction products to which an organic acid has been added are preferably used for tanning hides or for re-tanning neutralised leathers. In this case, the reaction products, the pH value of which has been adjusted to preferably 3 to 4 by the addition of the bases, have preferred pH values of 2.5 to 3.5 after the addition of the acid.

In order to achieve a good filling effect and buffability of the treated leather, the reaction products according to the invention can, for re-tanning leather, be used in the presence of at least one lignin-sulphonic acid salt, such as is obtained from the isolation of cellulose, and/or albumin glue, such as glutin glue or gelatine.

The reaction products according to the invention can also be used at the same time as tanning agents, fillers and/or bleaching agents for chrome leather.

Further subjects of the present invention thus relate to agents for tanning or re-tanning hides and leather, which contain at least one reaction product of the composition indicated above, a process for tanning or re-tanning hides and leathers with at least one such reaction product and hides or leather tanned or re-tanned by this process.

In agents for re-tanning leather, which contain lignin-sulphonic acid salts and/or albumin glues in addition to the reaction products according to the invention, the content of the reaction products employed is at least as great as the content of the additives mentioned.

When tanning or re-tanning hides or leather, the procedure is appropriately such that hides or leather are treated with an aqueous solution containing at least one reaction product according to the invention and the material tanned in this way is rinsed and then stuffed and dried. If desired, dyeing can be carried out prior to stuffing.

As a rule, 100 to 200, and preferably 150 to 200, parts by weight of water and 1 to 32 parts by weight, calculated relative to the dry substance, of at least one of the reaction products according to the invention are employed per 100 parts by weight of leather or hide.

In particular, 100 parts by weight of delimed pelt are tanned with 150 to 200 parts by weight of water and 12 to 32 parts by weight of one of the reaction products according to the invention. The reaction products which have a pH value which has been adjusted to 2.5 to 3.5 with an organic acid are preferred for this purpose. The use of reaction products to which no acid has been added and which have a pH value of 5 to 7 after the addition of the bases is also possible if the pH value of the tanning bath is adjusted to 3.2 to 4.0 with an organic acid, for example formic acid.

In particular, 100 parts by weight of chrome-tanned leather which has been neutralised in the customary manner using, for example, formates or bicarbonates, are re-tanned with 1 to 16, and preferably 1 to 8, parts by weight of one of the reaction products and optionally with at most an equal amount of a lignin-sulphonic acid salt and/or of an albumin glue in aqueous solution. Above all, reaction products which contain an organic acid are employed for this purpose.

The tanned material is rinsed and then stuffed with a customary stuffing agent which is preferably fast to light and is based on, for example, sulphonated sperm oil or neats' foot oil.

After drying, this gives a white or very pale leather which has excellent fastness to light, a fine, compact, smooth grain and a soft handle. The strong bleaching effect achieved on re-tanning is especially advantageous, in particular on chrome leather.

The percentages and parts in the Examples which follow are parts by weight and percentages by weight. The relationship between parts by volume and parts by weight is the same as that between ml and g.

EXAMPLE 1

300 parts of ditolyl ether (1.51 mols of a mixture of isomers) and 500 parts (5.31 mols) of phenol are mixed and sulphonated with 765 parts of 20% oleum (corresponding to 8.15 mols of sulphuric acid) at 125° to 130° C. for 3 hours. The mixture of sulphonic acids is now heated to 160° C. under a reduced pressure of 15 mm Hg for 5 hours. After this time the acid titre no longer changes and is 4.3. In order to determine the acid titre, a sample of the resulting mixture of sulphonic acids is diluted with water and titrated against an aqueous 1.0 N solution of sodium hydroxide using Congo red as the indicator.

100 parts of the mixture of sulphonic acids are dissolved in 20 parts of water. 5 parts of a 30% strength aqueous solution of formaldehyde are allowed to run into the solution at 80° to 85° C. The condensation reaction is continued for 2 hours at the same temperature. After adding 85 parts of water, the pH of the reaction solution is adjusted to 4.0 with 44 parts of a 25% strength aqueous solution of ammonia and subsequently 6 parts of an 85% strength formic acid are added.

255 parts of a red-brown coloured syrup of low viscosity which dissolves in water to give a clear solution are obtained as the tanning agent. Analysis gives the following values:
Solids content: 43.7%
Tanning agents: 27.4%
Substances other than tanning agents: 16.3%
Percentage of tanning agents in the total solids: 62.7

EXAMPLE 2

A mixture of 308 parts of 94% strength sulphuric acid and 416 parts of 20% strength oleum (corresponding to 7.38 mols of sulphuric acid) are allowed to run rapidly into 518 parts (3.04 mols) of diphenyl ether. The temperature rises to about 110° C. 240 parts (2.55 mols) of molten phenol are then also added to the sulphonation mixture. The mixture is now kept at 125° C. for 2 hours. The mixture is sulphonic acids is then heated to 150° C. under 15 mm Hg until the acid titre no longer changes and is 4.6; this takes 2 to 3 hours. 1,280 parts of the mixture of sulphonic acids are obtained.

200 parts of the abovementioned mixture of sulphonic acids are mixed with 40 parts of water and dissolved at 80° C. A solution of 15 parts of urea in 50 parts of a 30% strength aqueous solution of formaldehyde are now allowed to run in at this temperature at a rate such that the temperature remains within 80° to 85° C. After all of the formaldehyde solution has run in, the condensation reaction is continued for a further 6 hours. The viscous solution is diluted with 110 parts of water, the pH is adjusted to 4.0 with 82 parts of an aqueous 25% strength solution of ammonia and 12 parts of an 85% strength formic acid are then added. 509 parts of a pale brown viscous syrup which dissolves in water to give a clear solution are obtained as the tanning agent. Analysis to determine the tanning agent content gives the following values:
 Solids content: 47.7%
 Tanning agents: 31.8%
 Substances other than tanning agents: 15.9%
 Percentage of tanning agents in the total solids: 66.7

A product which has the same properties is obtained when a solution of 30 parts of dimethylolurea in 40 parts of water is employed in place of the solution of 15 parts of urea in 50 parts of a 30% strength aqueous solution of formaldehyde.

EXAMPLE 3

A mixture of 700 parts of ditolyl ether (3.53 mols of a mixture of isomers) and 300 parts (3.19 mols) of phenol is sulphonated with 860 parts (8.76 mols) of sulphuric acid monohydrate for 2 hours at 130° C. The resulting mixture of sulphonic acids is now heated to 145° C. under 12 to 15 mm Hg until the acid titre is 4.4 and no longer decreases; this takes 3 to 4 hours. 1,640 parts of the mixture of sulphonic acids are obtained.

100 parts of this mixture of sulphonic acids are melted with 20 parts of water and 6 parts of urea are added. 20 parts of a 30% strength aqueous solution of formaldehyde are now allowed to run in dropwise at 90° to 95° C. After all of the formaldehyde solution has run in, the condensation reaction is carried out for 3 hours at 95° to 98° C. After adding 73 parts of water, the pH of the reaction mixture is adjusted to 4.0 with 36 parts of a 25% strength aqueous solution of ammonia and 6 parts of an 85% strength formic acid are then added.

260 parts of a pale brown syrup which dissolves in water to give a clear solution are obtained as the tanning agent and analysis thereof gives the following values:
 Solids content: 47.3%
 Tanning agents: 33.6%
 Substances other than tanning agents: 13.7%
 Percentage of tanning agents in the total solids: 70.9

EXAMPLE 4

25 parts of water are added to 100 parts of the condensed sulphonic acid mixture prepared according to Example 3 and the mixture is melted at 60° to 65° C. After adding 3 parts of urea, 8.1 parts of a 37% strength aqueous solution of formaldehyde is added dropwise at 60° to 65° C. The condensation reaction is then continued for 3 hours at 60° to 65° C.

After adding 50 parts of water, the pH of the reaction mixture is adjusted to 4.5 with a 30% strength aqueous solution of sodium hydroxide and 3 parts of oxalic acid are then added. After evaporating the reaction solution under reduced pressure, 120 parts of a pale brown, water-soluble tanning agent powder are obtained.

Analysis to determine the tanning agent content gives the following values:
 Solids content: 92.9%
 Tanning agents: 56.3%
 Substances other than tanning agents: 36.6%
 Percentage of tanning agents in the total solids: 60.6

EXAMPLE 5

100 parts of the condensed sulphonic acid mixture prepared according to Example 1 are melted with 20 parts of water at 80° C. After adding 12 parts of urea, the solution is cooled to 60° C. and 40 parts of a 30% strength aqueous solution of formaldehyde are added at a rate such that the temperature does not rise above 65° C. The subsequent condensation reaction takes 15 hours at 60° to 65° C.

The viscous reaction solution is diluted with 80 parts of water and the pH is adjusted to 3.5 with 105 parts of a 30% strength aqueous solution of potassium hydroxide and then to 3.2 with 6 parts of an 80% strength acetic acid.

360 parts of a pale brown, viscous syrup which dissolves in water to give a clear solution are obtained. Analysis gives the following result:
 Solids content: 38.2%
 Tanning agents: 25.2%
 Substances other than tanning agents: 13.0%
 Percentage of tanning agents in the total solids: 66.0

EXAMPLE 6

604 parts of ditolyl ether (3.05 mols of a mixture of isomers) and 724 parts (7.38 mols) of sulphuric acid monohydrate are mixed. The temperature rises to about 100° C. The reaction mixture is kept at this temperature for one hour and 272 parts of a mixture of about 40% of m-cresol and about 60% of p-cresol (2.51 mols of the mixture of isomers) are then added. A sulphonation reaction is now carried out for 2 hours at 125° C. The mixture of sulphonic acids is heated to 145° C. and kept at this temperature for 5 hours under 12 mm Hg. After this time the acid titre remains constant and is 4.4. 1,405 parts of the mixture of sulphonic acids are obtained.

100 parts of the above mixture of sulphonic acids are brought into solution with 20 parts of water and 4.5 parts of urea at 80° C. 15 parts of a 30% strength aqueous solution of formaldehyde are now added dropwise at 80° to 95° C. After all of the formaldehyde solution has run in, the condensation reaction is continued for a further 3 hours. After dilution with 67 parts of water; the pH of the reaction solution is adjusted to 4.0 with 42 parts of a 25% strength aqueous solution of ammonia and then to 3.1 with an 85% strength formic acid. The resulting tanning agent (255 parts) in a brown solution which is miscible with water in all proportions.

Analysis to determine the tanning agent content gives the following values:
 Solids content: 46.2%
 Tanning agents: 31.5%
 Substances other than tanning agents: 14.7%
 Percentage of tanning agents in the total solids: 68.2

EXAMPLE 7

A mixture of 400 parts (4.25 mols) of phenol and 600 parts of ditolyl ether (3.03 mols of a mixture of isomers) is sulphonated with 1,000 parts (10.2 mols) of sulphuric acid monohydrate for one hour at 120° C. The mixture of sulphonic acids is then heated to 170° C. under 15 mm Hg and kept at this temperature until the acid titre is 4.5 and no longer decreases; this takes 3 hours. 1,738 parts of the mixture of sulphonic acids are obtained.

100 parts of the mixture of sulphonic acids are dissolved in 35 parts of water and 6 parts of urea at 80° C. 6 parts of paraformaldehyde are added in small portions in the course of 20 minutes. The reaction solution is then warmed to 90° to 95° C. and kept at this temperature for 2½ hours. After diluting with 50 parts of water, the pH of the reaction solution is adjusted to 3.8 with 38 parts of a 25% strength aqueous solution of ammonia and 6 parts of 85% strength formic acid are then added.

The resulting tanning agent (225 parts) is a pale brown, viscous syrup which dissolves in water to give a clear solution and gives the following values on analysis to determine the tanning agent content:
Solids content: 51.0%
Tanning agents: 38.1%
Substances other than tanning agents: 12.9%
Percentage of tanning agents in the total solids: 74.7

EXAMPLE 8

20 parts of water and 6 parts of urea are added to 100 parts of the mixtue of sulphonic acids prepared according to Example 7 and the mixture is warmed to 80° C. 20 parts of a 30% strength aqueous solution of formaldehyde are now added at a rate such that the temperature rises to 90° to 95° C. The condensation reaction is brought to completion at this temperature and this takes about 2½ hours.

After diluting with 50 parts of water, the pH of the reaction solution is adjusted to 4.2 with a 30% strength aqueous solution of sodium hydroxide and 10 parts of maleic acid are then added. After drying under reduced pressure at 80° C., 130 parts of a pale brown powder which dissolves in water to give a clear solution are obtained.

Analysis gives the following values:
Solids content: 97.8%
Tanning agents: 61.9%
Substances other than tanning agents: 35.9%
Percentage of tanning agents in the total solids: 63.6

EXAMPLE 9

900 parts (4.54 mols) of ditolyl ether (mixture of isomers) and 100 parts (1.06 mols) of phenol are mixed and sulphonated with 700 parts (7.14 mols) of sulphuric acid monohydrate for 2 hours at 130° C. The mixture of sulphonic acids is warmed to 155° C. under 12 mm Hg and kept at this temperature for 3 hours. After this time the acid titre no longer decreases and is 3.4. 1,510 parts of the mixture of sulphonic acids are obtained.

100 parts of the above mixture of sulphonic acids are melted in 25 parts of water at 80° C. 4.5 parts of urea are then added to this mixture. 15 parts of a 30% strength aqueous solution of formaldehyde are allowed to run dropwise into the homogeneous solution at a rate such that the temperature does not rise above 85° C. After the addition has ended, the condensation reaction is continued for a further 4 hours at 80° to 85° C. After diluting with 80 parts of water, the pH of the reaction solution is adjusted to 3.6 with 21 parts of ethanolamine and 7 parts of lactic acid are then added.

The resulting tanning agent (220 parts) is a pale brown, viscous syrup which dissolves in water to give a clear solution and gives the following values on analysis:
Solids content: 54.5%
Tanning agents: 38.3%
Substances other than tanning agents: 16.2%
Percentage of tanning agents in the total solids: 70.2

EXAMPLE 10

100 parts of the mixture of sulphonic acids prepared according to Example 9 are dissolved in 25 parts of water at 90° to 95° C. 20 parts of a 30% strength aqueous solution of formaldehyde are added dropwise at this temperature and after the addition has ended the condensation reaction is continued for a further 2½ hours. After diluting with 50 parts of water, the pH of the reaction solution is adjusted to 4.0 with 39 parts of a 25% strength aqueous solution of ammonia and a mixture of 7 parts of an 85% strength formic acid and 7 parts of an 80% strength acetic acid is then added.

240 parts of a pale syrup which flows readily and dissolves in water to give a clear solution are obtained as the tanning agent. Analysis gives the following result:
Solids content: 47.9%
Tanning agents: 34.3%
Substances other than tanning agents: 13.6%
Percentage of tanning agents in the total solids: 71.6

EXAMPLE 11

584 parts of ditolyl ether (2.94 mols of a mixture of isomers) are mixed with 724 parts (7.38 mols) of sulphuric acid monohydrate and the mixture is heated to 130° C. 262 parts (2.78 mols) of molten phenol are added to the homogeneous mixture and the mixture is sulphonated for 2 hours. The mixture of sulphonic acids is heated to 150° C. under 15 mm Hg until the acid titre is 4.2 and no longer decreases; this takes 4 hours. 1,370 parts of the mixture of sulphonic acids are obtained.

100 parts of the above mixture of sulphonic acids are dissolved in 25 parts of water at 80° C. A mixture of 3 parts of urea and 3 parts of biuret is added to this solution. 20 parts of a 30% strength aqueous solution of formaldehyde are allowed to run dropwise into the solution at 80° to 85° C. After 5 hours the condensation reaction has ended. For working-up, 50 parts of water are added and the pH of the reaction solution is adjusted to 6.0 with a 25% strength aqueous solution of ammonia. The solution is evaporated to dryness at 80° C. under reduced pressure.

115 parts of a pale brown powder which dissolves in water to give a clear solution are obtained.

Analysis to determine the tanning agent content, after adjusting the pH of the solution for analysis to 3.5 with formic acid, gives the following values:
Solids content: 99.9%
Tanning agents: 83.7%
Substances other than tanning agents: 16.2%
Percentage of tanning agents in the total solids: 83.8

A product which ha virtually the same properties is obtained when 6 parts of thiourea or 6.8 parts of ethyleneurea are employed in place of the urea/biuret mixture.

EXAMPLE 12

A mixture of 300 parts of ditolyl ether (1.76 mols of a mixture of isomers) and 200 parts (2.12 mols) of phenol is sulphonated with 570 parts (5.82 mols) of sulphuric acid monohydrate for 2 hours at 130° C. The resulting mixture of sulphonic acids is now heated to 145° C. under about 14 mm Hg and kept at this temperature until the acid titre no longer decreases (titre=5.2); this takes about 5 hours.

930 parts of the mixture of sulphonic acids are obtained.

300 parts of this mixture of sulphonic acids are dissolved in 60 parts of water at 80° C. After adding 27 parts of urea, 45 parts of a 30% strength aqueous solution of formaldehyde are added dropwise at such a rate that a temperature of 80° to 85° C. is maintained. The condensation reaction is continued at this temperature for 5 hours. After diluting with 100 parts of water, the pH of the reaction mixture is adjusted to 4.0 with 133 parts of a 48% strength solution of sodium hydroxide and the mixture is then evaporated to dryness at 70° to 80° C. under reduced pressure.

370 parts of a pale brown powder which dissolves in water to give a clear solution are obtained.

Analysis to determine the tanning agent content, after adjusting the pH of the solution for analysis to 3.2 with formic acid, gives the following values:
Solids content: 99.6%
Tanning agents: 55.3%
Substances other than tanning agents: 44.3%
Percentage of tanning agents in the total solids: 55.5

EXAMPLE 13

100 parts of the mixture of sulphonic acids obtained according to Example 12 are mixed with 20 parts of water and 3 parts of urea and dissolved at 75° C. 15 parts of a 30% strength aqueous solution of formaldehyde are now allowed to run in dropwise at 85° to 90° C. After the addition has ended, the condensation reaction is continued for a further 4 hours. After diluting with 50 parts of water, the pH of the reaction solution is adjusted to 3.8 with 44 parts of a 25% strength aqueous solution of ammonia and then to 3.5 with 6 parts of an 80% strength acetic acid.

225 parts of a pale brown syrup which flows readily and readily dissolves in water are obtained. Analysis gives the following values:
Solids content: 50.3%
Tanning agents: 28.4%
Substances other than tanning agents: 21.9%
Percentage of tanning agents in the total solids: 56.5

EXAMPLE 14

125 parts of ditolyl ether (0.63 mol of a mixture of isomers) and 125 parts (0.73 mol) of diphenyl ether are initially introduced and 396 parts of 20% oleum (corresponding to 4.22 mols of sulphuric acid) are added at such a rate that the temperature does not rise above 80° C. 250 parts (2.65 mols) of molten phenol are poured into the homogeneous mixture and the mixture is heated rapidly to 135° C. The sulphonation reaction is carried out for 2 hours at this temperature.

The mixture of sulphonic acids is then heated to 160° C. under a reduced pressure of 15 mm Hg for 4 hours. After this time the acid titre is 3.5 and no longer changes.

770 parts of the mixture of sulphonic acids are obtained.

100 parts of the above mixture of sulphonic acids are dissolved in 25 parts of water at 80° C. After adding 9 parts of urea, 12.2 parts of a 37% strength aqueous solution of formaldehyde are then allowed to run in dropwise. The condensation reaction is continued for a further 4 hours at 80° to 85° C. After diluting with 50 parts of water, the pH of the reaction mixture is adjusted to 4.0 with 50 parts of a 30% strength aqueous solution of sodium hydroxide and then to 3.2 with 1.5 parts of an 85% strength formic acid.

This gives 245 parts of a pale brown syrup which dissolves in water to give a clear solution and gives the following values on analysis:
Solids content: 49.7%
Tanning agents: 33.0%
Substances other than tanning agents: 16.7%
Percentage of tanning agents in the total solids: 66.4

EXAMPLE 15

100 parts of the mixture of sulphonic acids according to Example 3 are melted with 20 parts of water and 6 parts of urea are added. 20 parts of a 30% strength aqueous solution of formaldehyde are now allowed to run in dropwise at 90° to 95° C. After all of the formaldehyde solution has run in, the condensation reaction is carried out for 3 hours at 95° to 98° C. After adding 25 parts of water, the pH of the reaction mixture is adjusted to 6.0 with 40 parts of a 25% strength aqueous solution of ammonia and the mixture is then evaporated to dryness at 80° C. under reduced pressure.

118 parts of a pale brown powder which dissolves in water to give a clear solution are obtained.

Analysis to determine the tanning agent content, after adjusting the pH of the solution for analysis to 3.2 with formic acid, gives the following values:
Solids content: 97.7%
Tanning agents: 72.5%
Substances other than tanning agents: 25.2%
Percentage of tanning agents in the total solids: 74.2

EXAMPLE 16

100 parts of the mixture of sulphonic acids according to Example 3 are melted with 20 parts of water and 6 parts of urea are added. 20 parts of a 30% strength aqueous solution of formaldehyde are now allowed to run in dropwise at 90° to 95° C. After all of the formaldehyde solution has run in, the condensation reaction is carried out for 3 hours at 95° to 98° C. After adding 25 parts of water, the pH of the reaction mixture is adjusted to 6.0 with 40 parts of a 25% strength aqueous solution of ammonia and the resulting mixture is then mixed with 70 parts of a neutral, 50% strength, aqueous solution of glutin glue. The homogeneous mixture is then dried.

This gives 166 parts of a pale brown, water-soluble powder which, as a tanning agent, has a particularly good filling effect.

EXAMPLE 17

100 parts of a chrome-tanned calf leather which has been neutralised in the customary manner are re-tanned for 2 hours with a solution consisting of 150 parts of water and 4 parts (parts calculated relative to dry substance) of a tanning agent according to one of Examples 1 to 10, 13 or 14.

After rinsing briefly, the re-tanned leather is stuffed, in the customary manner, using 4 to 6 parts of a stuffing agent which is fast to light and which is based on sulphonated sperm oil and the leather is then dried.

This gives a leather which has a pale colour coupled with outstanding fastness to light and has a fine close grain.

EXAMPLE 18

100 parts of a delimed calf pelt are tanned for 24 hours with 200 parts of water and 24 parts (parts calculated relative to dry substance) of a tanning agent according to one of Examples 2 to 8, 13 or 14.

After stuffing and working-up, a white leather which is fast to light and of good firmness and has a fine compact grain is obtained.

EXAMPLE 19

100 parts of chrome-tanned heifer flanks which have been neutralised in the customary manner are re-tanned for 1½ hours with 200 parts of water and 5 parts (parts calculated relative to dry substance) of a tanning agent according to one of Examples 2 to 9. After stuffing and drying, a leather which has a very pale colour coupled with excellent fastness to light and a very favourable composite grain is obtained.

EXAMPLE 20

100 parts of a leather which has been chrome-tanned in the customary manner and has not been neutralised are re-tanned for 2½ hours with a solution consisting of 100 parts of water and 5 parts of the tanning agent according to one of Examples 11, 12, 15 and 16.

After stuffing and drying, a leather which has a pale colour and a compact fibre structure, in addition to a fine and firm grain, is obtained.

I claim:

1. A sulphonated, aromatic reaction product of
   (1) 100 parts by weight of a sulphonation product of
      (A) 10 to 90 percent by weight of an unsubstituted diphenyl ether or of a diphenyl ether which is substituted by methyl,
      (B) 90 to 10 percent by weight of an unsubstituted phenol, or of a phenol which is substituted by methyl, the sum of components (A) and (B) being 1 mol. and
      (C) 1 to 2 mols, calculated as sulphonic acid, of a sulphonating agent and
   (2) 4 to 24 parts by weight of a reaction mixture consisting of
      (D) an aminoplast-forming agent and
      (E) formaldehyde or a formaldehyde releasing agent, or
   (3) 4 to 24 parts by weight of an aminoplast precondensate, said aromatic reaction product being produced by a process, which comprises reacting components (A), (B) and (C) simultaneously at 110° to 180° C. or initially reacting component (A) with component (C) at 110° to 120° C. and then with component (B) at 110° to 180° C. or initially reacting component (B) with component (C) at 110° to 120° C. and then with component (A) at 110° to 180° C. to give the sulphonation product (1), further reacting said sulphonation product (1) at a temperature from 60° to 95° C. with components (2) or (3) to give a reaction product, then adding an organic or inorganic base to said reaction product and finally optionally adding an organic acid to said reaction product.

2. A reaction product according to claim 1, which is obtained from 100 parts by weight of component (1) and 9 to 15 parts by weight of component (2) or (3).

3. A reaction product according to claim 1, in which component (2) consists of 1 mol of component (D) and 1 to 3 mols of component (E).

4. A reaction product according to claim 1, in which component (3) consists of a mono-, di- or trimethylolated aminoplast precondensate.

5. A reaction product according to claim 1, in which component (A) consists of diphenyl ether or a ditolyl ether.

6. A reaction product according to claim 1, in which component (B) consits of a cresol or of phenol.

7. A reaction product according to claim 1, in which component (C) consists of oleum or sulphuric acid monohydrate.

8. A reaction product according to claim 1, in which component (E) consist of paraformaldehyde or of an aqueous solution of formaldehyde.

9. A reaction product according to claim 1, in which component (D) consists of thiourea, ethyleneurea, biuret or urea.

10. A reaction product according to claim 1, in which component (3) consists of dimethylolated thiourea, ethyleneurea, biuret or urea.

11. A process for the manufacture of a reaction product according to claim 1, in which
    (1) 100 parts by weight of a sulphonation product of
       (A) 10 to 90 percent by weight of an unsubstituted diphenyl ether or of a diphenylether which is substituted by methyl,
       (B) 90 to 10 percent by weight of an unsubstituted phenol, or of a phenol which is substituted by methyl, the sum of components (A) and (B) being 1 mol, and
       (C) 1 to 2 mole, calculated as sulphuric acid, of a sulphonating agent; components (A), (B) and (C) first being reacted with one another at temperature from 110° to 180° C. to give the sulphonation product (1); are further reacted at temperature from 60° to 95° C. with
    (2) 4 to 24 parts by weight of a reaction mixture consisting of
       (D) an aminoplast-forming agent and
       (E) formaldehyde or a formaldehyde releasing agent, or
    (3) 4 to 24 parts by weight of an aminoplast precondensate; and an organic or inorganic base is added to the resulting reaction product and an organic acid is then optionally added.

12. A process for tanning or re-tanning hides or chrome-tanned leather, in which hides or leather are treated with an aqueous solution containing a reaction product according to claim 1 and the material tanned in this way is rinsed and subsequently stuffed and dried.

13. The hides which have been tanned, or leather which has been re-tanned, by the process according to claim 12.

14. An agent for tanning hides or for re-tanning leather which contains a reaction product having the composition indicated in claim 1.

15. A reaction product according to claim 1, wherein components (A), (B) and (C) are reacted at an initial temperature from 110° C. to 140° C. and then the temperature of the reaction is raised to 145° to 170° C.

16. A reaction product according to claim 1, wherein components (A), (B) and (C) are reacted at an initial temperature from 120° C. to 135° C. and then the temperature of the reaction is raised to 145° to 170° C.

* * * * *